United States Patent
Hardiman et al.

(10) Patent No.: US 12,483,607 B2
(45) Date of Patent: Nov. 25, 2025

(54) SECURE VIDEOTELEPHONY CONNECTION OVER HETEROGENEOUS CLIENT CONFIGURATIONS

(71) Applicant: PMHi2, INC., Arlington, VA (US)

(72) Inventors: Patrick Hardiman, Arlington, VA (US); Maksim Kozlenko, Dubai (AE)

(73) Assignee: PMHi2, Inc., Arlington, VA (US)

( * ) Notice: Subject to any disclaimer, the term of this patent is extended or adjusted under 35 U.S.C. 154(b) by 0 days.

(21) Appl. No.: 18/554,530

(22) PCT Filed: Apr. 9, 2021

(86) PCT No.: PCT/US2021/026730
§ 371 (c)(1),
(2) Date: Oct. 9, 2023

(87) PCT Pub. No.: WO2022/216296
PCT Pub. Date: Oct. 13, 2022

(65) Prior Publication Data
US 2024/0205271 A1    Jun. 20, 2024

(51) Int. Cl.
*G06F 15/16* (2006.01)
*H04L 9/40* (2022.01)
*H04L 65/1069* (2022.01)

(52) U.S. Cl.
CPC .......... *H04L 65/1069* (2013.01); *H04L 63/04* (2013.01)

(58) Field of Classification Search
CPC .......................... H04L 65/1069; H04L 63/04
See application file for complete search history.

(56) References Cited

U.S. PATENT DOCUMENTS 8,181,262 B2   5/2012  Cooper et al.
8,943,568 B1*  1/2015  Hromi ................... H04L 63/107
                                                    726/26

(Continued)

OTHER PUBLICATIONS

PCT Search Report and Written Opinion mailed Jun. 22, 2021 for PCT application No. PCT/US21/26730, 14 pages.

(Continued)

*Primary Examiner* — Padma Mundur
(74) *Attorney, Agent, or Firm* — Lee & Hayes, P.C.

(57) ABSTRACT

Methods and systems implement a videotelephony platform and a reception exchange configured to connect calls through multiple backbone telecommunication services based on heterogeneous client configurations. Due to the intensive infrastructural investments required to host audio and video telecommunication, providers of telemedicine services generally cannot self-host videotelephony services, and rely on third-party telecommunication services instead. However, to comply with laws and regulations imposing security requirements over communication of personal medical information, the implementation of end-to-end encryption on patient-to-practitioner communication channels is commonly adopted to eliminate the risk that communication of personal health data leads to unexpected breaches in compliance. Heterogeneity between hardware specifications and software specifications of different client devices causes the selection of available backbone services to become limited. Therefore, a reception exchange service according to example embodiments of the present disclosure selects a compliant backbone service for which client configurations on both ends of a call are compatible.

18 Claims, 5 Drawing Sheets

(56) References Cited

U.S. PATENT DOCUMENTS

| | | |
|---|---|---|
| 9,398,260 B2 | 7/2016 | Kondo |
| 2007/0248220 A1 | 10/2007 | Crandell et al. |
| 2009/0080884 A1 | 3/2009 | Gerszberg et al. |
| 2013/0041728 A1* | 2/2013 | Morrow ............. G06Q 30/0283 |
| | | 705/14.4 |
| 2013/0227015 A1 | 8/2013 | Mihara et al. |
| 2017/0302466 A1* | 10/2017 | Stoner .................... H04L 67/01 |

OTHER PUBLICATIONS

PCT International Preliminary Report on Patentability mailed Oct. 19, 2023 for PCT Application No. PCT/US21/026730, 13 pages.

* cited by examiner

```
┌─────────────────────────────────────────────────────────────────────┐
│ HOSTED FRONTEND OF RECEPTION EXCHANGE SERVICE HOSTED AT TELEMEDICINE │
│ SERVER RECEIVES CALL CONNECTION REQUEST OVER SECURE CONNECTION, CALL │
│  CONNECTION REQUEST INCLUDING FIRST CLIENT CONFIGURATION OF FIRST    │
│   CLIENT DEVICE AND SECOND CLIENT CONFIGURATION OF SECOND CLIENT     │
│                              DEVICE                                  │
│                               202                                    │
└─────────────────────────────────────────────────────────────────────┘
                                  │
                                  ▼
┌─────────────────────────────────────────────────────────────────────┐
│  RECEPTION EXCHANGE SERVICE SELECTS COMPLIANT BACKBONE SERVICE,      │
│  AMONG MULTIPLE BACKBONE SERVICES, FOR WHICH FIRST CLIENT            │
│  CONFIGURATION IS COMPATIBLE CONFIGURATION AND FOR WHICH SECOND      │
│           CLIENT CONFIGURATION IS COMPATIBLE CONFIGURATION           │
│                               204                                    │
└─────────────────────────────────────────────────────────────────────┘
                                  │
                                  ▼
┌─────────────────────────────────────────────────────────────────────┐
│  RECEPTION EXCHANGE SERVICE CONVERTS FIRST IDENTIFIER AND SECOND     │
│  IDENTIFIER INTO, RESPECTIVELY, FIRST PROTECTED COMMUNICATION        │
│  IDENTIFIER AND SECOND PROTECTED COMMUNICATION IDENTIFIER, AND       │
│  FORWARDS FIRST PROTECTED COMMUNICATION IDENTIFIER AND SECOND        │
│     PROTECTED COMMUNICATION IDENTIFIER TO SELECTED BACKBONE SERVICE  │
│                               206                                    │
└─────────────────────────────────────────────────────────────────────┘
                                  │
                                  ▼
┌─────────────────────────────────────────────────────────────────────┐
│ RECEPTION EXCHANGE SERVICE ESTABLISHES SECURE VIDEOTELEPHONY CALL    │
│      SESSION BETWEEN FIRST CLIENT DEVICE AND SECOND CLIENT DEVICE    │
│                               208                                    │
└─────────────────────────────────────────────────────────────────────┘
```

SECURE VIDEOTELEPHONY CONNECTION OVER HETEROGENEOUS CLIENT CONFIGURATIONS

CROSS-REFERENCE TO RELATED APPLICATION

This application is a U.S. national stage application under 35 USC § 371 of International Application No. PCT/US2021/26730 filed on Apr. 9, 2021 and entitled "SECURE VIDEOTELEPHONY CONNECTION OVER HETEROGENEOUS CLIENT CONFIGURATIONS," the entire contents of which is incorporated herein by reference.

BACKGROUND

Healthcare providers increasingly offer telemedicine services, wherein medical practitioners deliver patient clinical care, advice, diagnosis, and the like by audio and video telecommunication. The addition of video to conventional telecommunications, in particular, enables practitioners to visually monitor patient conditions, improving quality of services and personalization of care.

With the rise of digital sharing and storage of personal information, many countries and jurisdictions worldwide have enacted privacy laws which govern the storage and sharing of healthcare data over public networks. In the United States, the Health Insurance Portability & Accountability Act ("HIPAA") requires that computing systems storing electronic Protected Health Information ("ePHI"), such as Electronic Health Records ("EHRs"), be protected by various security measures. In Europe, the General Data Protection Regulation requires processors of personal data, including health data, to meet various security standards. In Canada, though the Personal Information Protection and Electronic Documents Act ("PIPEDA") does not apply to healthcare organizations, provincial laws governing health data privacy tend to be drafted mirroring the provisions and requirements of PIPEDA, imposing security requirements on electronically stored personal health data.

Among technological solutions which have been deemed sufficient to comply with legally mandated security protections for personal health data, encryption is consistently utilized as an established compliance tool. In practitioner-patient relationships in which personal health data needs to be communicated between a patient and a practitioner (as well as additional parties, such as family members or other persons having medical power of attorney), the communication channel used between the patient and the practitioner (as well as additional parties) may possess vulnerabilities which cause the communicated data to become unprotected or exposed. Thus, the implementation of end-to-end encryption on patient-to-practitioner communication channels, while not legally mandated, may suffice to eliminate the risk that communication of personal health data leads to unexpected breaches in compliance.

Due to the intensive infrastructural investments required to host audio and video telecommunication, providers of telemedicine services generally cannot self-host videotelephony services, and rely on third-party telecommunication services instead. Consequently, providers of telemedicine services have a need to build frontend computer-executable applications which integrate with backbone telecommunication hosting in a fashion seamless to both patients and practitioners.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Systems and methods discussed herein are directed to implementing videotelephony, and more specifically to implementing a videotelephony platform providing a reception exchange configured to connect calls through any of multiple backbone telecommunication services based on heterogeneous client configurations.

Figure 1:
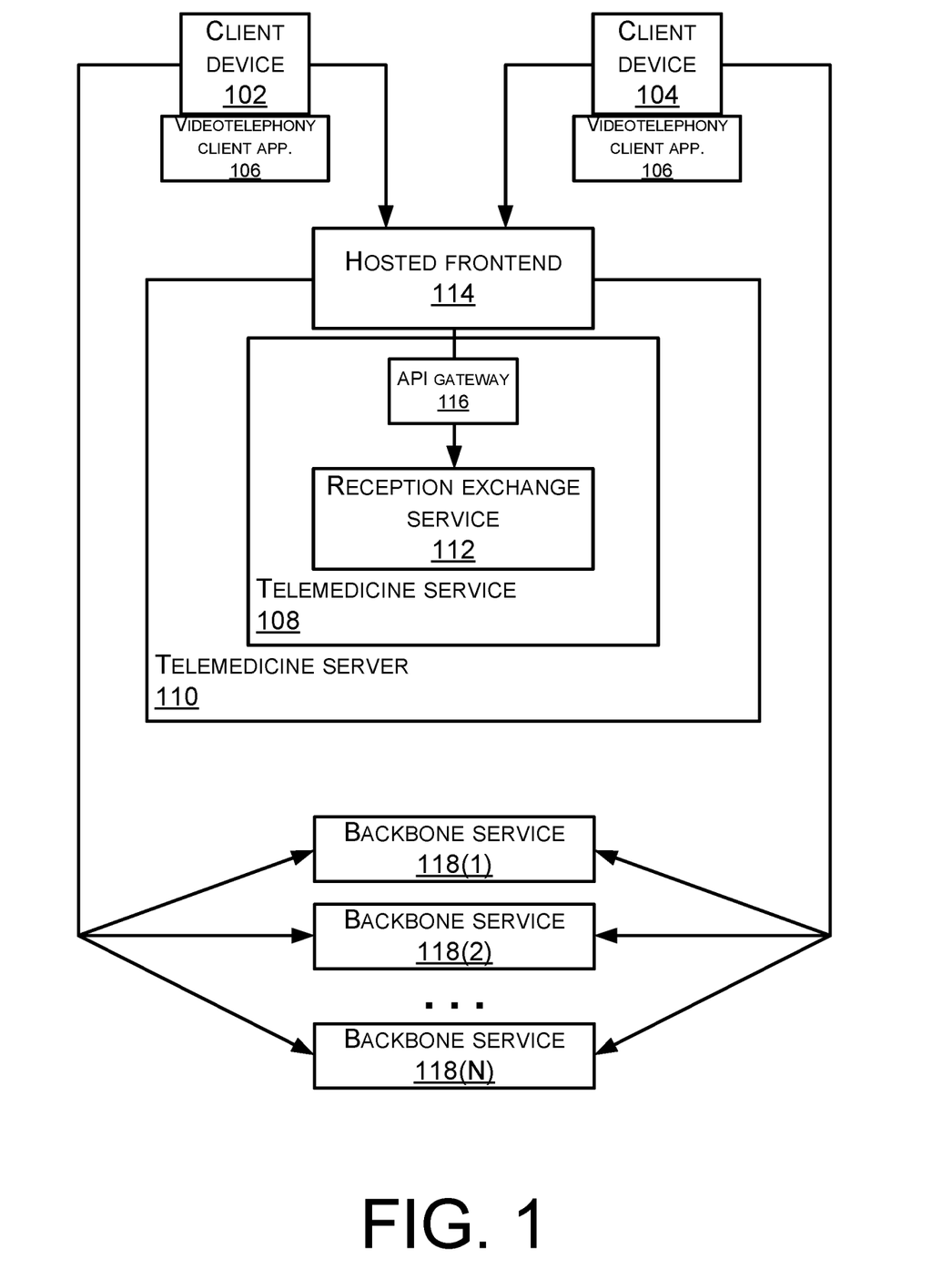
FIG. 1 illustrates an architectural diagram of client devices, a telemedicine server, and a backbone server according to example embodiments of the present disclosure.

FIG. 1 illustrates an architectural diagram of client devices, a telemedicine server, and a backbone server according to example embodiments of the present disclosure.

According to example embodiments of the present disclosure, a telemedicine service provider provides one or more servers hosting a telemedicine service which may be accessed by a first end user and a second end user. Typically, a first end user may be a medical practitioner and a second end user may be a patient of the medical practitioner. A first end user and a second user, located remotely from each other, may respectively operate a first client device 102 and a second client device 104 to both run instances of a videotelephony client application 106. The videotelephony client application 106 may, for example, be a Web application, running in a browser on each client device and/or a hosted application operating on each client device.

It should be understood that two instances of a videotelephony client application 106 according to example embodiments of the present disclosure may include substantially similar, but not the exact same, set of computer-executable instructions running on both the first client device 102 and the second client device 104. Since a first client configuration of the first client device 102 and a second client configuration of the second client device 104 may be heterogeneous (as shall be described subsequently), the different instances of the videotelephony client application 106 may be configured differently to run on the two different client devices. For example, an instance of the videotelephony client application 106 running on a personal desktop, tablet, laptop computer, or other electronic device may be a Web application or network based application written in any suitable programming language or framework. An instance of the videotelephony client application running on a mobile computer may be an application written in mobile application-specific programming languages or frameworks.

It should further be understood that while a client device may be configured to run multiple browsers, including running multiple browsers concurrently, for the purpose of understanding the present disclosure, only one browser running on the client device is engaged in running an instance of the videotelephony client application to connect a videotelephony call as described below. Subsequently, the browser running the instance of the videotelephony client application may be referred to as the "videotelephony browser," or simply the "browser," for brevity. Any other browsers which may be running on the same client device need not be referenced for understanding example embodiments of the present disclosure.

Both the first client device 102 and the second client device 104 may be, respectively, configured with input interfaces (such as microphones, image capture devices, and the like), output interfaces (such as speakers and display screens, and the like), and communication modules (not illustrated), as shall be described subsequently. Presently, the first client device 102 and the second client device 104 may respectively be configured to receive audio and video input signals over their respective input interfaces, and may respectively be configured to generate audio and video output signals over their respective output interfaces 102B and 104B. Furthermore, the first client device 102 and the second client device 104 may respectively be configured to encode audio and video input signals into communication packets and transmit those audio and video data packets by their respective communication modules over communication networks.

Furthermore, the videotelephony client application 106 may include computer-executable instructions which configure both the first client device 102 and the second client device 104 to mutually connect a videotelephony call. Thus, a pending videotelephony call to be connected between the first client device 102 and the second client device 104 may be routed by a telemedicine service 108 hosted by one or more telemedicine servers 110 of the telemedicine service provider (as shall be described subsequently) to establish a videotelephony call between the first client device 102 and the second client device 104, enabling the practitioner and the patient to hold a telemedicine session wherein the practitioner may provide and the patient may receive clinical care, advice, diagnosis, and the like. Techniques for implementing such a videotelephony client application 106 are generally as known to persons skilled in the art, and need not be reiterated herein.

It should be understood that a videotelephony call according to example embodiments of the present disclosure may be bilaterally connected by two instances of a videotelephony client application 106 running on a first client device 102 and a second client device 104 both joining a same videotelephony call session. For example, the videotelephony client application 106 may enable one of the two client devices to initiate a videotelephony call session without a second caller, enabling the other of the two client devices to join into the videotelephony call session at any time thereafter. This may enable a patient-practitioner telemedicine service model wherein a patient may call into a virtual "waiting room" to initiate a service session, enabling a practitioner to join the service session upon becoming available to meet the patient.

Furthermore, it should be understood that additional end users, operating a third client device, a fourth client device, and the like may join the videotelephony call in a similar manner. Additional end users may include, for example, family members of a patient, persons having medical power of attorney in the patient's stead, and other such persons whose presence does not violate laws and regulations imposing security requirements over communication of personal medical information. While throughout the present disclosure a first client device and a second client device are referenced for ease of understanding, third client devices, fourth client devices, and the like may be added to each subsequent reference to a first client device and a second client device without substantially altering the principles of example embodiments of the present disclosure.

A videotelephony call between the first client device 102 and the second client device 104 may be established by a reception exchange service 112 hosted by the one or more telemedicine servers 110. The reception exchange service 112 may be hosted as a set of computer-executable instructions running on one or more processors of the one or more telemedicine servers 110, providing a hosted frontend 114 having frontend interfaces which may be called by two instances of the videotelephony client application forwarding one or more call connection requests to the telemedicine servers. The frontend interfaces may include a call connection interface which may receive and parse parameters such as those described below. A hosted frontend of a reception exchange service may receive a videotelephony call connection request over a secure connection, the call connection request including a first client configuration of a first client device and a second client configuration of a second client device.

Thus, a first client device 102 and a second client device 104 may respectively run instances of a videotelephony client application 106 to connect a videotelephony call therebetween, with either of the client devices first forwarding a call connection request to a telemedicine server 110. Parameters of the call connection request may be parsed by the hosted frontend 114 and forwarded through, for instance, an API gateway 116 to the reception exchange service 112.

Parameters of the call connection request may include respective client identifiers of the first client device 102 and the second client device 104 which may be referenced by a telemedicine service 108 hosted at the telemedicine server 110, which may resolve the respective client identifiers as referring to particular registered users of the telemedicine service 110. Parameters of the call connection request may further include first client configurations and second client configurations (as shall be subsequently described). The first client configurations and the second client configurations may at least, in part, be specified in headers of data packets carrying the call connection request.

It should be understood that a connection between the first client device 102 and the reception exchange service 112 and a connection between the second client device 104 and the reception exchange service 112 may each be a secured connection, such as a Hypertext Transfer Protocol Secure ("HTTPS") connection based on a trusted certificate hosted at the telemedicine server.

The frontend interfaces may determine, for a first client configuration and a second client configuration, at least one backbone service (as shall be described subsequently) among multiple backbone services 118(1), 118(2), . . . , 118(N) for which the first client configuration is a compatible configuration, and for which the second client configuration is a compatible configuration (where compatibility of configurations shall be described subsequently). In other words, for one or more backbone services, a first client configuration may be an incompatible configuration; for one or more backbone services, a second client configuration may be an incompatible configuration; and for one or more backbone services, both a first client configuration and a second client configuration may be incompatible configurations. Nevertheless, for one or more other backbone services, both the first client configuration and the second client configuration may be compatible configurations; for brevity, such backbone services shall be referred to as a "compatible backbone service."

According to example embodiments of the present disclosure, the first client device 102 and the second client device 104 may be heterogeneous in their respective hardware specifications. For example, the first client device 102 and the second client device 104 may be heterogeneous in processor(s) specifications (such as in architecture, model, frequency, number of cores, cache size, and the like), memory specifications (such as in architecture, frequency, capacity, and the like), storage specifications (such as in architecture, mechanical implementation, capacity, and the like), input interfaces specifications (such as in signal-to-noise ratio, dynamic range, power requirements, and the like for microphones, sensor construction, sensor size, frame rate, and the like for image capture devices), output interfaces specifications (such as resolution, panel type, refresh rate, and the like for display screens), communication module specifications (such as wired or wireless network security standards), and the like.

Thus, the first client device 102 and the second client device 104 may each be any among personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

Additionally, the first client device 102 and the second client device 104 may be heterogeneous in their respective operating system specifications; for example, the first client device 102 and the second client device 104 may each run any among various desktop operating systems and mobile operating systems compatible with their respective hardware specifications as known to persons skilled in the art. Additionally, the first client device 102 and the second client device 104 may be heterogeneous in their respective browser specifications; for example, the first client device 102 and the second client device 104 may each run any number among various browsers compatible with their respective operating systems as known to persons skilled in the art.

A variety of commercial telecommunication providers host, on proprietary servers, telecommunication backbone services. These proprietary servers, henceforth referred to as "backbone servers," provide dedicated networking hosts which are configured to route audio and video data packets over a variety of public communication networks between a first client device and a second client device. Backbone servers are generally provisioned with sufficient computing resources and network traffic resources, such as data centers hosting large-scale servers, routers, switches, and other such network infrastructure, to centrally process and route large volumes of audio and video data packet traffic. Furthermore, a backbone service hosted on the backbone servers may receive audio and video data packet traffic originating from various source client devices and directed to various destination client devices; forward audio and video data packet traffic among various router and switch network resources of the backbone servers; distribute traffic load among various network resources, such as geographically remote data centers; and the like.

As illustrated in FIG. 1, each of the backbone services 118(1), 118(2), . . . , 118(N) are generally hosted on one or more public networks, such as the Internet. FIG. 1 should not be understood as indicating that each of the backbone services 118(1), 118(2), . . . , 118(N) is hosted on a same network. Instead, each of the backbone services 118(1), 118(2), . . . , 118(N) may be arbitrarily hosted on different backbone servers on public networks which are part of the larger Internet, without any particular relation to each other.

It should be understood that according to example embodiments of the present disclosure, each of the backbone services 118(1), 118(2), . . . , 118(N) referenced with regard to the present disclosure may encrypt audio and video data packets received from source client devices and destination client devices end-to-end, meaning that the packets are encrypted upon being forwarded from a source client device to the backbone servers, and not decrypted until forwarded from the backbone servers to a destination client device. In this manner, audio and video packet content remains secure and private while being transported through each of the backbone services 118(1), 118(2), . . . , 118(N), thereby providing a level of security compliant with applicable jurisdictional laws and regulations imposing security requirements over communication of personal medical information; for example, different cryptographic techniques provide quantifiably different levels of security as known to persons skilled in the art, and it may be understood that some cryptographic techniques may provide heightened security which more consistently ensure compliance, while other cryptographic techniques may provide lowered security which may not as consistently ensure compliance. Such backbone services 118(1), 118(2), . . . , 118(N) providing sufficient levels of security over end-to-end audio and video data packets for the purpose of complying with laws and regulations imposing security requirements over communication of personal medical information are subsequently referred to as "compliant backbone services," for brevity.

However, it should be understood that different telecommunication backbone services 118(1), 118(2), . . . , 118(N) may be configured to handle network traffic originating from different client configurations. For example, certain commercial telecommunication providers may configure certain backbone services to not support certain processor(s) specifications, memory specifications, storage specifications, input interfaces specifications, output interfaces specifications, communication modules, and the like. For example, the telecommunication provider may configure minimum processor specifications and memory specifications to enforce a minimum performance level for video encoding and decoding on client devices, as well as computational power required for encrypting and decrypting audio and video data packets by a cryptographic algorithm satisfying a compliant security level. The telecommunication provider may configure minimum storage specifications to enforce adequate storage space on client devices for encoding and decoding audio and video signals. The telecommunication provider may configure certain required input interfaces specifications and certain required output interfaces specifications in accordance with customer-programmed specifications for video input and output formatting. The telecommunication provider may configure certain required communication module specifications to enforce a minimum bandwidth requirement, a maximum level of tolerable latency, and other such network connectivity requirements which impact the quality of videotelephony. Moreover, the telecommunication provider may configure each of these specifications to preferentially optimize call latency and output for personal desktop or laptop computers, for mobile devices, or for a combination thereof.

Furthermore, the telecommunication provider may configure certain backbone services to not support certain operating system specifications, browser specifications, and the like, or any combination thereof. The telecommunication provider may configure certain required operating system specifications and browser specifications to maintain compatibility of software design at the backbone services with operating systems and browsers running on client devices. Generally, backbone servers of any individual telecommunication provider may host multiple versions of any individual backbone service having software design invoking application programming interfaces ("APIs") specific to particular versions of operating systems and/or particular versions of Web browsers. Even so, certain APIs invoked in the software design of the backbone services may be depreciated in particular versions of operating systems and/or particular versions of browsers, or may postdate particular versions of operating systems and/or particular versions browsers.

For example, software design of a first backbone service may utilize the Web Real-Time Communication ("WebRTC"); for such a first backbone service, client devices where an operating system specification is iOS by APPLE INC. of Cupertino, California, and a browser specification is not Safari by APPLE INC., may be considered to have an incompatible client configuration, since the WebRTC API cannot function on client devices under such a configuration (since, as known to persons skilled in the art, the iOS operating system suppresses WebRTC APIs outside of the Safari browser).

Consequently, corresponding to each backbone service, there may be any number of incompatible client configurations and compatible client configurations. A backbone service is suitable for connecting a call between the first client device 102 and the second client device 104 in the event that both a first client configuration and a second client configuration are compatible client configurations for the backbone service. Thus, as a consequence of heterogeneity between hardware specifications and software specifications of the first client device and the second client device, the selection of available backbone services supported by a telemedicine service as described above (particularly among compliant backbone services) may be reduced to a subset thereof.

As a result, according to example embodiments of the present disclosure, the reception exchange service implements secure videotelephony connection over heterogeneous client configurations.

Figure 2:
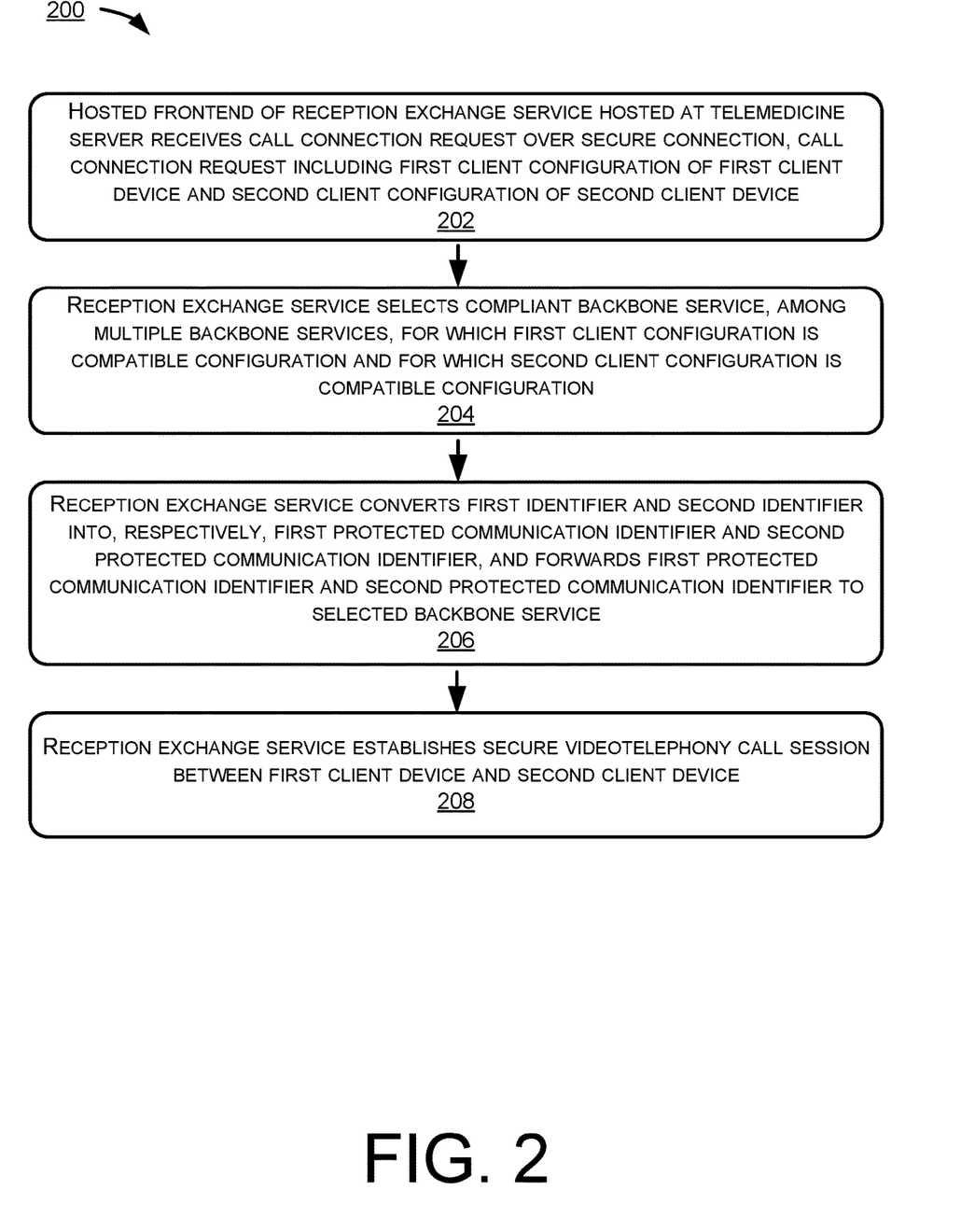
FIG. 2 illustrates a flowchart of a method for secure videotelephony connection over heterogeneous client configurations according to example embodiments of the present disclosure.

FIG. 2 illustrates a flowchart of a method 200 for secure videotelephony connection over heterogeneous client configurations according to example embodiments of the present disclosure.

At a step 202, a hosted frontend of a reception exchange service hosted at a telemedicine server receives a call connection request over a secure connection, the call connection request including a first client configuration of a first client device and a second client configuration of a second client device.

As described above, the call connection request may first be received from a first client device or a second client device, and may include a first identifier of the first client device and a second identifier of the second client device. The call connection request indicates that these two client devices seek to connect a videotelephony call therebetween. Moreover, the request being made to the telemedicine server indicates that the videotelephony call should be connected through a compliant backbone service.

As described above, a connection between the first client device and the reception exchange service and a connection between the second client device and the reception exchange service may each be a secured connection, such as a Hypertext Transfer Protocol Secure ("HTTPS") connection based on a trusted certificate hosted at the telemedicine server.

As described above, the first client configuration describes hardware specifications, operating system specifications, browser specifications, and the like for a first client device, and the second client configuration describes hardware specifications, operating system specifications, browser specifications, and the like for a second client device. At least parts of the first client configuration and the second client configuration may be specified in headers of data packets carrying the call connection request.

The hosted frontend may parse the first identifier, the second identifier, the first client configuration, and the second client configuration, and forward the first identifier, the second identifier, the first client configuration, and the second client configuration to the reception exchange service through an API gateway as described above.

At a step 204, the reception exchange service selects a compliant backbone service, among multiple backbone services, for which the first client configuration is a compatible configuration and for which the second client configuration is a compatible configuration.

As described above, different telecommunication backbone services may be configured to handle network traffic originating from different client configurations. For example, certain commercial telecommunication providers may configure certain backbone services to not support certain processor(s) specifications, memory specifications, storage specifications, input interfaces specifications, output interfaces specifications, communication modules, and the like. For example, the telecommunication provider may configure minimum processor specifications and memory specifications to enforce a minimum performance level for video encoding and decoding on client devices, as well as computational power required for encrypting and decrypting audio and video data packets by a cryptographic algorithm satisfying a compliant security level. The telecommunication provider may configure minimum storage specifications to enforce adequate storage space on client devices for encoding and decoding audio and video signals. The telecommunication provider may configure certain required input interfaces specifications and certain required output interfaces specifications in accordance with customer-programmed specifications for video input and output formatting. The telecommunication provider may configure certain required communication module specifications to enforce a minimum bandwidth requirement, a maximum level of tolerable latency, and other such network connectivity requirements which impact the quality of videotelephony. Moreover, the telecommunication provider may configure each of these specifications to preferentially optimize call latency and output for personal desktop or laptop computers, for mobile devices, or for a combination thereof.

Furthermore, the telecommunication provider may configure certain backbone services to not support certain operating system specifications, browser specifications, and the like, or any combination thereof. The telecommunication provider may configure certain required operating system specifications and browser specifications to maintain compatibility of software design at the backbone services with operating systems and browsers running on client devices. Generally, backbone servers of any individual telecommunication provider may host multiple versions of any individual backbone service having software design invoking application programming interfaces ("APIs") specific to particular versions of operating systems and/or particular versions of browsers. Even so, certain APIs invoked in the software design of the backbone services may be depreciated in particular versions of operating systems and/or particular versions of browsers, or may postdate particular versions of operating systems and/or particular versions browsers.

Consequently, for one or more backbone services, a first client configuration may be an incompatible configuration; for one or more backbone services, a second client configuration may be an incompatible configuration; and for one or more backbone services, both a first client configuration and a second client configuration may be incompatible configurations.

The reception exchange service may determine one or more compliant backbone services for which the first client configuration is a compatible configuration and for which the second client configuration is a compatible configuration. In such cases, the reception exchange service may arbitrarily select one among these determined compliant backbone services; may select one among these determined compliant backbone services based on service quality metrics; may select one among these determined compliant backbone services based on geographical proximity to the first client device and the second client device, based on IP addresses thereof; and may select one among these determined compliant backbone services based on measured packet delays between a backbone server of each respective backbone service and the first client device and/or the second client device; or may select one among these determined compliant backbone services according to any other networking metric which suitably determines potential quality of service differences. Alternatively and/or additionally, the reception exchange service may select one among these determined compliant backbone services based on lowest service fees to be incurred in connecting the videotelephony call requested to be connected.

At a step 206, the reception exchange service converts the first identifier and the second identifier into, respectively, a first protected communication identifier and a second protected communication identifier, and forwards the first protected communication identifier and the second protected communication identifier to the selected backbone service.

The selected backbone service may not be able to connect two client devices in a call based on identifiers specific to the telemedicine service hosting the reception exchange service. Thus, the identifiers should be converted to communication identifiers which may be used to connect a videotelephony communication channel between the two client devices over a communication network.

However, identifiers which conventionally allow call participants to connect a call, such as calling numbers, IP addresses, and identifiers otherwise unique to participants, may allow participants to be personally identified, meaning that this information could potentially be leaked as personal medical information, defeating the implementation of a level of security compliant with applicable jurisdictional laws and regulations imposing security requirements.

Consequently, each backbone service may further implement protected communication identifiers for each end user registered with the (telemedicine service provider) customer of the backbone service. Protected communication identifiers may be, for example, user identifiers maintained on a secured or encrypted basis by the backbone service provider; proxy phone numbers which anonymize calling numbers of each end user; and other such information mapped to individual end users such that the information cannot be used to personally identify those end users.

Thus, while the first protected communication identifier and the second protected communication identifier may be forwarded to the backbone service over a secure connection, leakage of the respective identifiers during this process will not compromise personal identities of the end users operating the first client device and the second client device.

Subsequently, the selected backbone service may establish a secure videotelephony call and may receive requests to connect to the secure videotelephony call from the first client device and the second client device in accordance with a videotelephony protocol (such as WebRTC as described above), processing the requests by connecting both client devices to the session.

At a step 208, the reception exchange service establishes a secure videotelephony call session between the first client device and the second client device.

The reception exchange service may, for example, host a backend service mesh which locally establishes video call session to be connected over a selected backbone service. The local video call session may be forwarded to one or both of the first client device and the second client device back over the secure connection, by forwarding semantic information and metadata required to connect an audio stream and a video stream to page elements displayed in a browser running on each of the first client device and the second client device.

Thereafter, the videotelephony client application running on the first client device and the second client device may starts streaming and receiving audio and video data packets in accordance with a videotelephony protocol, handled by APIs hosted on the backbone server (such as a Javascript SDK). The backbone service may handle end-to-end encryption of audio and video data packets transmitted between the first client device and the second client device.

Figure 3:
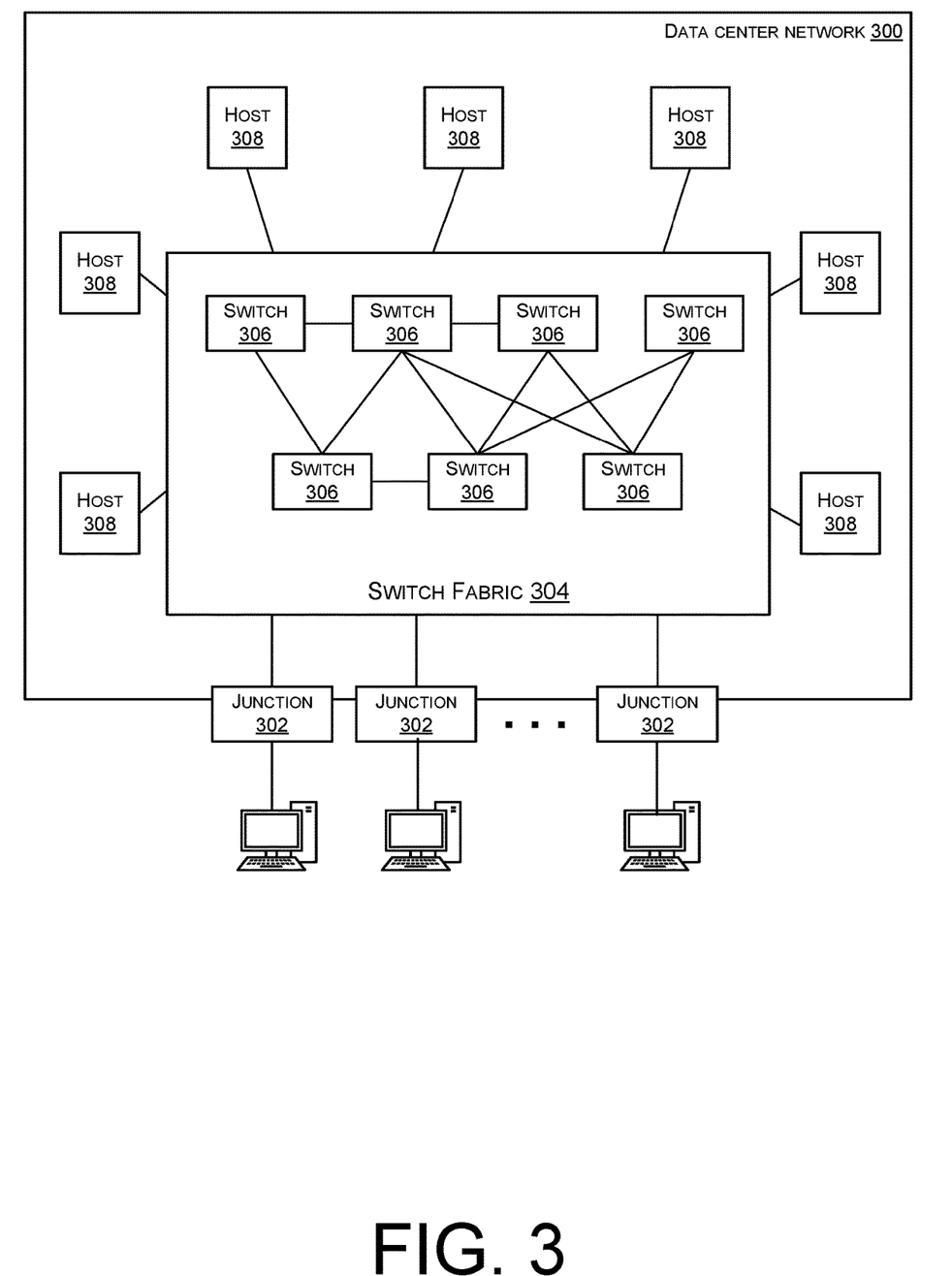
FIG. 3 illustrates an architectural diagram of an example data center network according to example embodiments of the present disclosure.

FIG. 3 illustrates an architectural diagram of an example data center network 300 according to example embodiments of the present disclosure.

Computer networks established in a data center interconnect computing resources such as physical and/or virtual processors, memory, storage, computer-executable applications, computer-readable data, and the like. A data center network 300 may receive inbound traffic from external hosts originating from outside networks, such as personal area networks ("PANs"), wired and wireless local area networks ("LANs"), wired and wireless wide area networks ("WANs"), the Internet, and so forth, through junctions 102 such as gateways, firewalls, and the like. Inbound traffic may take the form of packets formatted and encapsulated according to any combination of a variety of network communication protocols which may interoperate, such as Internet Protocol ("IP") and Transmission Control Protocol ("TCP"); virtualized network communication protocols such as Virtual Extensible LAN ("VxLAN"); routing protocols such as Multiprotocol Label Switching ("MPLS"); and the like.

Packets received in a data center network 300 may be passed from junctions 302 to a switch fabric 304 of the data center network 300. A switch fabric 304 generally refers to a component of a network architecture wherein a collection of some number of network switches 306(1), 306(2), . . . , 306(N) (where any unspecified switch may be referred to as a switch 306) interconnected by network connections. Any number of hosts 308 of the data center network 300 may connect to any number of arbitrary switches 306 of the switch fabric 304. Switches 306 of the switch fabric 304 may serve to forward packets between the hosts 308 of the data center network 300 so as to interconnect traffic between the hosts 308 without those hosts 308 being directly interconnected.

Hosts 308 of the data center network 300 may be servers which provide computing resources for other hosts 308 as well as external hosts on outside networks. These computing resources may include, for example, computer-executable applications, databases, platforms, services, virtual machines, and the like.

Figure 4:
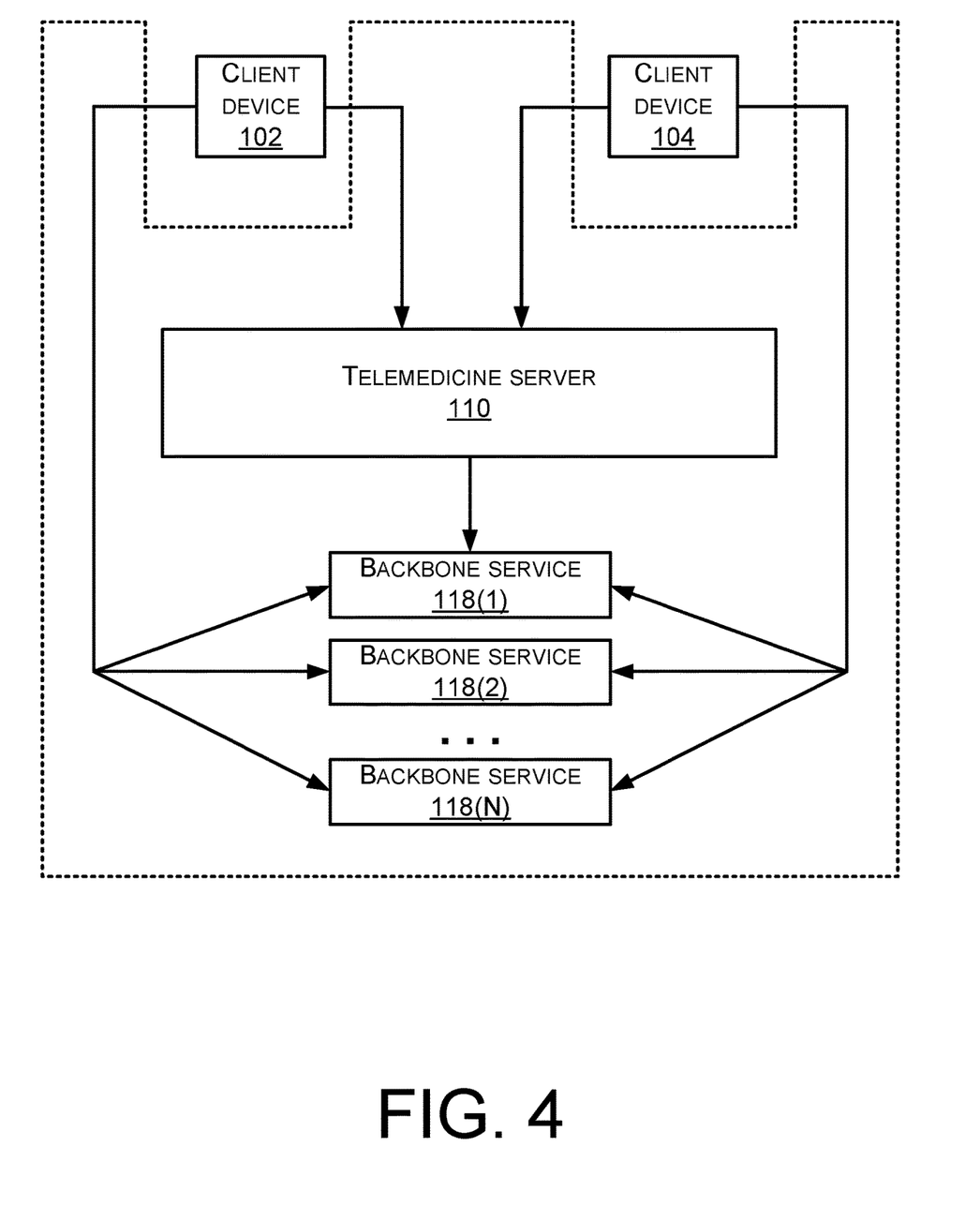
FIG. 4 illustrates a conceptual privacy boundary established between the first client device and the second client device according to example embodiments of the present disclosure.

FIG. 4 illustrates a conceptual privacy boundary established between the first client device and the second client device according to example embodiments of the present disclosure.

Example embodiments of the present disclosure provide secure connections from a first client device 102 to the telemedicine servers 110 and from a second client device 104 to the telemedicine servers 110, protecting information shared from the client devices, such as a first identifier and a second identifier, as well as a first client configuration and a second client configuration, from being made public as a result of using the telemedicine service 108.

Example embodiments of the present disclosure further provide secure connections from a first client device 102 to the backbone servers hosting a backbone service, and from a second client device 104 to the backbone servers hosting a backbone service.

Example embodiments of the present disclosure further provide end-to-end encryption for audio and video data packet traffic between the first client device 102 and the second client device 104.

Consequently, a conceptual privacy boundary is established around personally identifiable information of end users which may be shared with a telemedicine service provider and with a telecommunication backbone provider. By providing secure connections encompassing all outbound communications from the first client device and the second client device during the process of establishing a secure videotelephony connection, as well as encrypting audio and video data packets end-to-end, example embodiments of the present disclosure prevent data from leaking outside the conceptual boundary, thus providing sufficient levels of security for the purpose of complying with laws and regulations imposing security requirements over communication of personal medical information.

A conceptual privacy boundary, for illustration purposes, is depicted herein as a broken line, thought it should be understood that the privacy boundary does not necessarily correspond to any physical or virtual elements depicted in FIG. 4.

Figure 5:
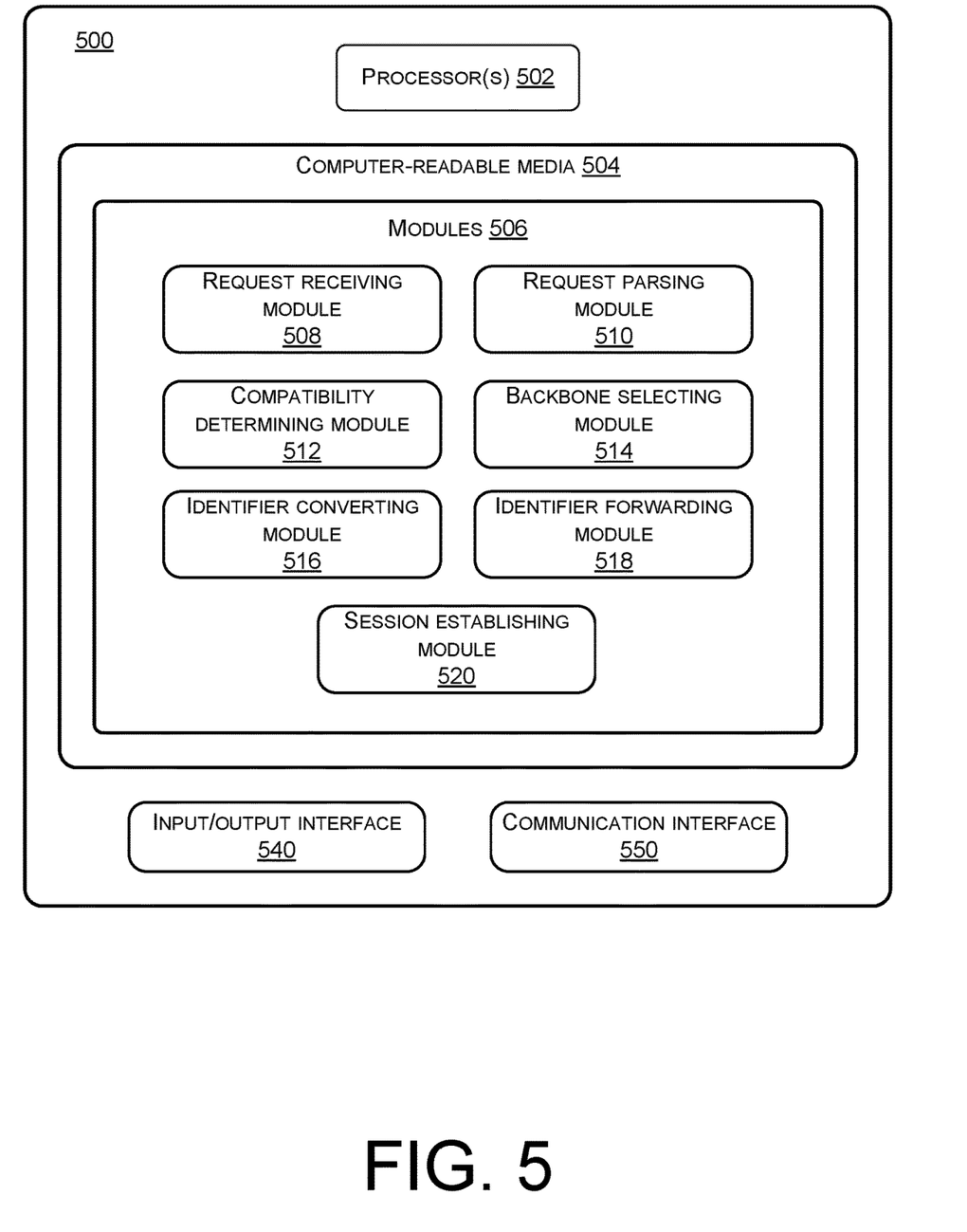
FIG. 5 illustrates an example server host for implementing the processes and methods described herein for implementing secure telephony connection over heterogeneous client configurations.

FIG. 5 illustrates an example server host 500 for implementing the processes and methods described above for implementing secure telephony connection over heterogeneous client configurations.

The techniques and mechanisms described herein may be implemented by multiple instances of the server host 500, as well as by any other computing device, system, and/or environment. The server host 500 may be a single computing system providing physical or virtual computing resources as known by persons skilled in the art. The server host 500 shown in FIG. 5 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The server host 500 may include one or more processors 502 and one or more computer-readable media 504 communicatively coupled to the processor(s) 502. The processor(s) 502 and computer-readable media 504 may be physical or may be virtualized and/or distributed. The processor(s) 502 may execute one or more modules and/or processes to cause the processor(s) 502 to perform a variety of functions. In embodiments, the processor(s) 502 may include a central processing unit ("CPU"), a graphics processing unit ("GPU"), both CPU and GPU, or other processing units or components known in the art. Additionally, each of the processor(s) 502 may possess its own local memory, which also may store program modules, program data, and/or one or more operating systems.

Depending on the configuration, the computer-readable media 504 may be an example of tangible non transitory computer storage media and may include volatile and non-volatile memory and/or removable and non-removable media implemented in any type of technology for storage of information such as computer readable instructions or modules, data structures, program modules or other data. Such computer readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processor(s) 502.

Several modules 506 such as instruction, data stores, and so forth may be stored within the computer-readable media 504 and configured to execute on the processor 502. The modules 506 may include, but are not limited to, a request receiving module 508, a request parsing module 510, a compatibility determining module 512, a backbone selecting module 514, an identifier converting module 516, an identifier forwarding module 518, and a session establishing module 520.

The request receiving module 508 may be configured to receive a call connection request over a secure connection as described above with reference to FIG. 2.

The request parsing module 510 may be configured to parse the first identifier, the second identifier, the first client configuration, and the second client configuration, and forward the first identifier, the second identifier, the first client configuration, and the second client configuration to the reception exchange service through an API gateway as described above with reference to FIG. 2.

The compatibility determining module 512 may be configured to determine one or more compliant backbone services for which the first client configuration is a compatible configuration and for which the second client configuration is a compatible configuration as described above with reference to FIG. 2.

The backbone selecting module 514 may be configured to selects a compliant backbone service, among multiple backbone services, for which the first client configuration is a compatible configuration and for which the second client configuration is a compatible configuration as described above with reference to FIG. 2.

The identifier converting module 516 may be configured to convert the first identifier and the second identifier into, respectively, a first protected communication identifier and a second protected communication identifier as described above with reference to FIG. 2.

The identifier forwarding module 518 may be configured to forward the first protected communication identifier and the second protected communication identifier to the selected backbone service as described above with reference to FIG. 2.

The session establishing module 520 may be configured to establish a secure videotelephony call session between the first client device and the second client device as described above with reference to FIG. 2.

The server host 500 may additionally include an input/output (I/O) interface 540 and a communication module 550 allowing the server host 500 to communicate with other systems and devices over a network, such as one or more public networks as described above with reference to FIG. 1. The network may include the Internet, wired media such as a wired network or direct-wired connections, and wireless media such as acoustic, radio frequency ("RF"), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-4. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

By the abovementioned technical solutions, the present disclosure provides a videotelephony platform and a reception exchange configured to connect calls through any of multiple backbone telecommunication services based on heterogeneous client configurations. Due to the intensive infrastructural investments required to host audio and video telecommunication, providers of telemedicine services generally cannot self-host videotelephony services, and rely on third-party telecommunication services instead. A variety of commercial telecommunication providers host, on proprietary servers, telecommunication backbone services, providing dedicated networking hosts which are configured to route audio and video data packets over a variety of public communication networks between a first client device and a second client device. However, for the purpose of complying with laws and regulations imposing security requirements over communication of personal medical information, the implementation of end-to-end encryption on patient-to-practitioner communication channels is commonly adopted to eliminate the risk that communication of personal health data leads to unexpected breaches in compliance. As a consequence of heterogeneity between hardware specifications and software specifications of different client devices, the selection of available backbone services supported by a telemedicine service becomes limited. Therefore, a reception exchange service according to example embodiments of the present disclosure selects a compliant backbone service, among multiple backbone services, for which client configurations on both ends of a call are compatible.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A method comprising:
    receiving, by a hosted frontend of a reception exchange service, a videotelephony call connection request over a secure connection, the call connection request includ- ing a first client configuration of a first client device and a second client configuration of a second client device; and selecting, by the reception exchange service, a compliant backbone service, among multiple backbone services, for which the first client configuration is a compatible configuration and for which the second client configuration is a compatible configuration, wherein selecting, by the reception exchange service, the compliant backbone service comprises selecting, from the multiple backbone services, the compliant backbone service that meets or exceeds:
a minimum processor specification indicated by the first client configuration,
a minimum performance level for video encoding and decoding indicated by the first client configuration,
a computational power threshold for encrypting and decrypting audio and video data packets by a cryptographic algorithm indicated by the first client configuration, and
a compliant security level indicated by the first client configuration.

2. The method of claim 1, wherein the first client configuration describes at least one of hardware specifications, operating system specifications, and browser specifications for a first client device, and the second client configuration describes at least one of hardware specifications, operating system specifications, and browser specifications for a second client device.

3. The method of claim 1, further comprising converting, by the reception exchange service, a first identifier of the first client device and a second identifier of the second client device into, respectively, a first protected communication identifier and a second protected communication identifier.

4. The method of claim 3, further comprising forwarding, by the reception exchange service, the first protected communication identifier and the second protected communication identifier to the selected backbone service.

5. The method of claim 4, wherein the selected backbone service is configured to establish a secure videotelephony call, and to receive requests to connect to the secure videotelephony call from a first client device and a second client device in accordance with a videotelephony protocol.

6. The method of claim 1, further comprising establishing, by the reception exchange service, a secure videotelephony call session between the first client device and the second client device.

7. A server host comprising:
one or more processors; and
memory communicatively coupled to the one or more processors, the memory storing computer-executable modules executable by the one or more processors that, when executed by the one or more processors, perform associated operations, the computer-executable modules comprising:
a request receiving module configured to receive a videotelephony call connection request over a secure connection, the call connection request including a first client configuration of a first client device and a second client configuration of a second client device; and
a compliance determining module configured to select a compliant backbone service, among multiple backbone services, for which the first client configuration is a compatible configuration and for which the second client configuration is a compatible configuration by selecting the compliant backbone service responsive to the compliant backbone service meeting or exceeding:
a minimum processor specification indicated by the first client configuration,
a minimum performance level for video encoding and decoding indicated by the first client configuration,
a computational power threshold for encrypting and decrypting audio and video data packets by a cryptographic algorithm indicated by the first client configuration, and
a compliant security level indicated by the first client configuration.

8. The server host of claim 7, wherein the first client configuration describes at least one of hardware specifications, operating system specifications, and browser specifications for a first client device, and the second client configuration describes at least one of hardware specifications, operating system specifications, and browser specifications for a second client device.

9. The server host of claim 7, wherein the compliance determining module is configured to select a compliant backbone service by determining one or more compliant backbone services for which the first client configuration is a compatible configuration and for which the second client configuration is a compatible configuration.

10. The server host of claim 7, further comprising an identifier converting module configured to convert a first identifier of the first client device and a second identifier of the second client device into, respectively, a first protected communication identifier and a second protected communication identifier.

11. The server host of claim 10, further comprising an identifier forwarding module configured to forward the first protected communication identifier and the second protected communication identifier to the selected backbone service.

12. The server host of claim 11, wherein the selected backbone service is configured to establish a secure videotelephony call, and to receive requests to connect to the secure videotelephony call from a first client device and a second client device in accordance with a videotelephony protocol.

13. A non-transitory computer-readable storage medium storing computer-readable instructions executable by one or more processors, that when executed by the one or more processors, cause the one or more processors to perform operations comprising:
receiving a videotelephony call connection request over a secure connection, the call connection request including a first client configuration of a first client device and a second client configuration of a second client device;
determining that two or more of multiple backbone services are compliant backbone services for which the first client configuration is a compatible configuration and for which the second client configuration is a compatible configuration; and
selecting, based at least in part on a first geographical proximity to the first client device, a second geographical proximity to the second client device, a minimum processor specification indicated by the second client configuration, a minimum performance level for video encoding and decoding indicated by the second client configuration, a computational power threshold for encrypting and decrypting audio and video data packets by a cryptographic algorithm indicated by the second client configuration, and a compliant security level indicated by the second client configuration, one of the two or more compliant backbone services for the videotelephony call connection a compliant backbone service, among multiple backbone services, for which the first client configuration is a compatible configuration and for which the second client configuration is a compatible configuration.

14. The non-transitory computer-readable storage medium of claim 13, wherein the first client configuration describes at least one of hardware specifications, operating system specifications, and browser specifications for a first client device, and the second client configuration describes at least one of hardware specifications, operating system specifications, and browser specifications for a second client device.

15. The non-transitory computer-readable storage medium of claim 13, wherein the operations further comprise converting a first identifier of the first client device and a second identifier of the second client device into, respectively, a first protected communication identifier and a second protected communication identifier.

16. The non-transitory computer-readable storage medium of claim 15, wherein the operations further comprise forwarding the first protected communication identifier and the second protected communication identifier to the selected backbone service.

17. The non-transitory computer-readable storage medium of claim 13, wherein the operations further comprise establishing a secure videotelephony call session between a first client device and a second client device.

18. The server host of claim 7, wherein the compliance determining module selects the compliant backbone service based at least in part on a service quality metric associated with individual ones of the multiple backbone services.

* * * * *